No. 786,096. PATENTED MAR. 28, 1905.
J. F. BYERS.
TIRE.
APPLICATION FILED NOV. 21, 1904.
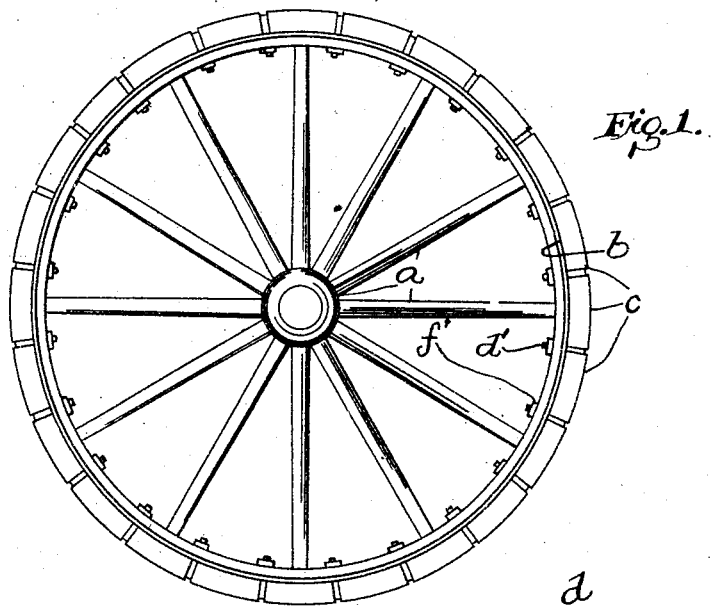
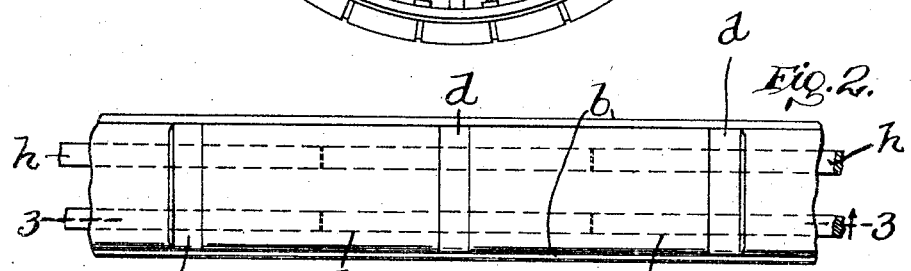
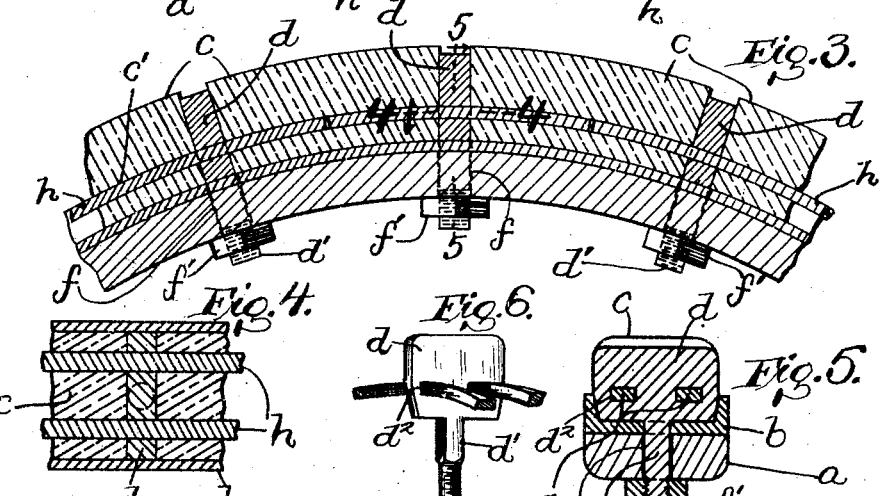
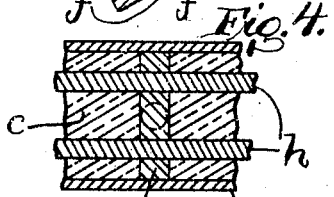
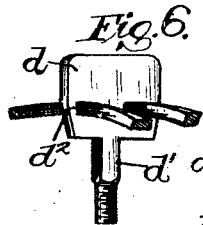
WITNESSES:
Daniel E. Daly,
Victor C. Lynch.
INVENTOR
John F. Byers
BY
Lynch & Dorer
his ATTORNEYS.

No. 786,096.

Patented March 28, 1905.

UNITED STATES PATENT OFFICE.

JOHN F. BYERS, OF RAVENNA, OHIO.

TIRE.

SPECIFICATION forming part of Letters Patent No. 786,096, dated March 28, 1905.

Application filed November 21, 1904. Serial No. 233,664.

*To all whom it may concern:*

Be it known that I, JOHN F. BYERS, a citizen of the United States of America, residing at Ravenna, in the county of Portage and State of Ohio, have invented certain new and useful Improvements in Tires; and I hereby declare the following to be a full, clear, and exact description of the invention, such as will enable others skilled in the art to which it pertains to make and use the same.

This invention relates to improvements in tires, and especially to solid rubber tires.

The object of this invention is to provide in a sectional tire means for mounting the tire-sections on the wheels so that they will be securely held in position on the felly of the wheel, while at the same time they will be capable of being readily removed therefrom when they become worn or injured.

This invention is designed to be an improvement on the invention secured to me by Letters Patent No. 727,746, dated May 12, 1903; and it consists in providing, in combination with a wheel, a plurality of tire-sections, each having a metallic core, and means for clamping the cores to the felly of the wheel, so as to securely hold the tire-sections in place and at the same time support the cores so that they will not crush or cause a disintegration of the portion of the tire between the core and the felly.

The invention further consists in the features of construction and combination of parts, as described in the specification, pointed out in the claims, and illustrated in the drawings.

In the accompanying drawings, Figure 1 shows a wheel equipped with my tire. Fig. 2 is an enlarged detail view, in top plan, of a portion of the wheel. Fig. 3 is a section on line 3 3, Fig. 2. Fig. 4 is a section on line 4 4, Fig. 3. Fig. 5 is a section on line 5 5, Fig. 3. Fig. 6 is a view of one of the clamping devices which secure the tire-sections to the wheel.

Again referring to the drawings, $a$ represents a wheel of the usual construction, around the felly of which is arranged a grooved rim $b$. The tire-sections $c$ preferably consist of blocks of rubber, which are arranged around the rim $b$, and are preferably spaced a short distance apart. In each tire-section $c$ are preferably formed two bores $c'$, which extend longitudinally therethrough. Between the ends of the tire-sections are arranged clamping devices, each of which comprises a metallic plate $d$, which is provided with a stem $d'$, preferably formed integral with said plate $d$, and screw-threaded at its lower end. The stem $d'$ is arranged to pass through an opening or hole $f$, formed in the felly. A nut $f'$ is secured on the end of the stem $d'$ after it has passed through the felly, so as to secure the plate $d$ firmly to the rim of the wheel. In the plate $d$ are formed openings $d^2$, which approximately register with the bores $c'$, formed in the tire-sections $c$. Through the openings $d^2$, formed in the plate $d$, are passed flat metallic bars $h$, which form prongs which project equally at each side of said plate and enter the bores formed in the tire-sections. The metallic bars $h$ are preferably made long enough to extend from the center of one tire-section through the plate $d$ to the center of the adjacent tire-section and form cores for the said sections. The openings in the plate $d$ are a little closer to the rim than the openings in the tire-sections, so that when the plates $d$ are secured to the felly the portion of the tire-sections between the bars $h$ and the rim of the wheel will be compressed, causing the tire to grip tightly on the rim of the wheel.

In my patent before referred to I provided a plate having projecting prongs, and the plate together with the prongs were inclosed in the tire-sections, so that a portion of the tire-sections intervened between the plates and the rim of the wheel. In practice I found that the portion of the tire between the plates and the rim soon disintegrated, which I attribute to the pounding action of the plates, as they were not rigidly supported away from the rim of the wheel. In my new construction the plates are clamped directly to the rim of the wheel, so that there can be no movement whatever of the said plates, and the prongs or bars are rigidly mounted in said plates, so that they are held away from the rim of the wheel. Therefore after the tire has been secured to the rim of the wheel the prongs will exert a constant pressure on the portion of the tire between them and the rim of the wheel, and no matter how great a load comes on the wheel that portion of the tire will be no further compressed, so that my clamping devices form means for preventing the undue compression and consequent disintegration of that portion of the tire which constitutes the bond between the body of the tire and the rim of the wheel.

What I claim is—

1. The combination with the felly of the wheel, of a plurality of tire-sections arranged around said felly, plates arranged between the adjacent ends of the tire-sections, and rigidly supported on the rim of the wheel, means for clamping said plates to the rim of the wheel and prongs secured to said plates at a distance from the rim of the wheel, and arranged to enter the tire-sections.

2. The combination with the felly of the wheel, of a plurality of tire-sections arranged around said felly so as to leave a space between each tire-section, said tire-sections being provided with bores in line with each other, plates arranged between the tire-sections and resting on the rim of the wheel, said plates having openings in line with the bores in the said tire-sections, metallic bars mounted in the openings in said plates and arranged to extend into the bores in the tire-sections and means for securing said plates to the felly of the wheel.

3. The combination with the felly of the wheel, of a plurality of tire-sections spaced around said felly, plates arranged between the tire-sections and resting on the rim of the wheel and provided with prongs arranged to extend into the tire-sections, screw-threaded stems formed integral with said plates and arranged to extend through openings in the felly of the wheel, and nuts arranged to engage the ends of said stems for clamping said plates against the rim of the wheel, substantially as described and for the purpose set forth.

In testimony whereof I sign the foregoing specification in the presence of two witnesses.

JOHN F. BYERS.

Witnesses:
  VICTOR C. LYNCH,
  N. L. McDONNELL.